(12) United States Patent
Siegl

(10) Patent No.: US 10,093,472 B2
(45) Date of Patent: Oct. 9, 2018

(54) STRETCH BLOW-MOLDED PLASTIC CONTAINER, IN PARTICULAR PLASTIC BOTTLE, FOR COMPENSATING VOLUME CHANGES OF THE FILLING MATERIAL, AND PREFORM

(71) Applicant: ALPLA Werke Alwin Lehner GmbH & Co. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 15/583,075

(22) Filed: May 1, 2017

(65) Prior Publication Data

US 2017/0233161 A1 Aug. 17, 2017

Related U.S. Application Data

(63) Continuation of application No. PCT/EP2015/073292, filed on Oct. 8, 2015.

(30) Foreign Application Priority Data

Oct. 29, 2014 (CH) ..................................... 1662/14

(51) Int. Cl.
B65D 1/02 (2006.01)
B65D 79/00 (2006.01)
B29B 11/14 (2006.01)
B29L 31/00 (2006.01)

(52) U.S. Cl.
CPC ............ B65D 79/005 (2013.01); B29B 11/14 (2013.01); B65D 1/0207 (2013.01);
(Continued)

(58) Field of Classification Search
CPC .. B65D 79/005; B65D 1/0207; B65D 1/0246; B29B 11/14; B29B 2911/14344;
(Continued)

(56) References Cited

U.S. PATENT DOCUMENTS 4,576,843 A * 3/1986 Beck ....................... B29C 49/08
215/373
9,254,941 B2 * 2/2016 Galownia .......... B65D 41/0414
(Continued)

FOREIGN PATENT DOCUMENTS

DE 203 14 295 U1 12/2003
EP 1 598 167 A1 11/2005
WO WO 03/055663 A1 7/2003

OTHER PUBLICATIONS

International Search Report (PCT/ISA/210) dated Dec. 22, 2015, by the European Patent Office as the International Searching Authority for International Application No. PCT/EP2015/073292.
(Continued)

Primary Examiner — Kareen Thomas

(74) Attorney, Agent, or Firm — Buchanan Ingersoll & Rooney PC

(57) ABSTRACT

A stretch blow-molded plastic container, including a container body, one longitudinal end of which is closed by a container bottom and to whose other longitudinal end is connected a shoulder section; and a container neck, which connects to the shoulder section, the shoulder section having at least two hinge-like areas that run in a circumferential direction, and which areas are arranged at a distance (a) from one another and in each case have a wall thickness (v, w) that is reduced compared to the adjoining areas, the stretch blow-molded plastic container having a total stretching ratio of greater than 11 for a longitudinal stretching ratio of 2.5 to 3.5.

20 Claims, 3 Drawing Sheets

(52) U.S. Cl.
CPC .... *B65D 1/0246* (2013.01); *B29B 2911/1442* (2013.01); *B29B 2911/1448* (2013.01); *B29B 2911/14326* (2013.01); *B29B 2911/14344* (2015.05); *B29L 2031/7158* (2013.01)

(58) Field of Classification Search
CPC ..... B29B 2911/1442; B29B 2911/1448; B29B 2911/14326; B29L 2031/7158
USPC ....... 220/639, 640, 646, 656, 657, 659, 327, 220/296, 289, 537; 215/40–55, 214, 217, 215/218, 243, 281, 329, 356, 357
See application file for complete search history.

(56) References Cited

U.S. PATENT DOCUMENTS

| | | | |
|---|---|---|---|
| 2005/0255269 A1 | 11/2005 | Jacobs | |
| 2008/0116162 A1* | 5/2008 | Penny | B65D 1/0246 215/44 |
| 2008/0314856 A1* | 12/2008 | Penny | B29C 49/06 215/252 |
| 2009/0188888 A1* | 7/2009 | Penny | B29B 11/14 215/329 |
| 2013/0213922 A1* | 8/2013 | Denis | B29C 49/0042 215/45 |
| 2013/0299445 A1* | 11/2013 | Cerracchio | B65D 1/0246 215/44 |

OTHER PUBLICATIONS

Written Opinion (PCT/ISA/237) dated Dec. 22, 2015, by the European Patent Office as the International Searching Authority for International Application No. PCT/EP2015/073292.

\* cited by examiner

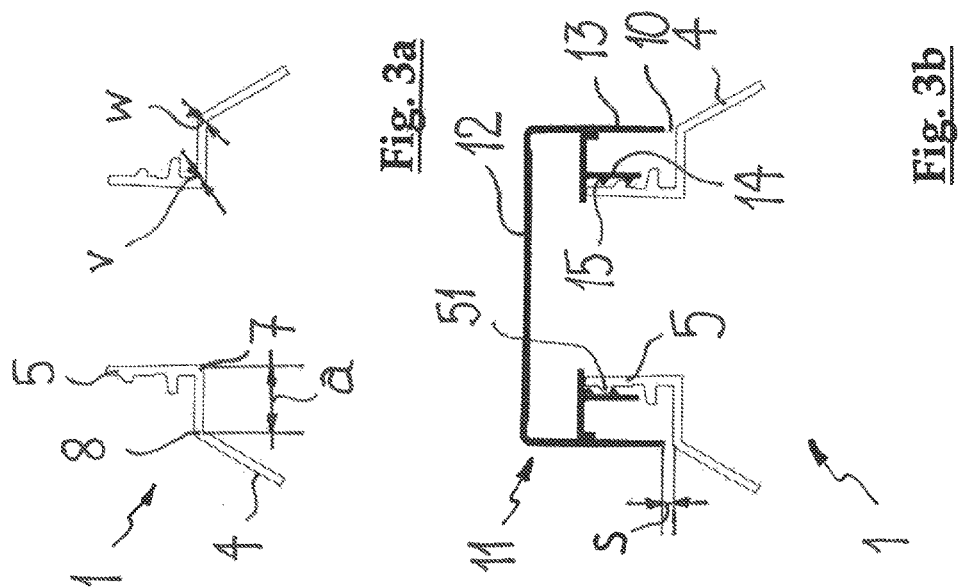
Fig. 3a
Fig. 3b
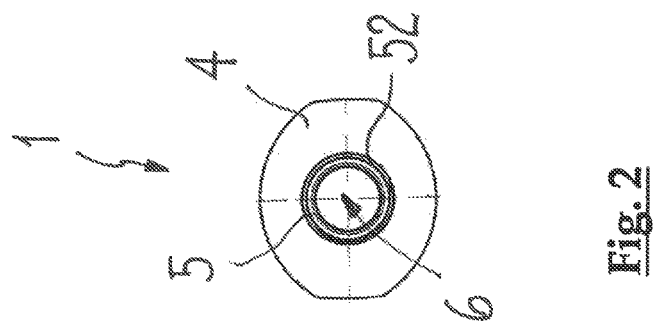
Fig. 2
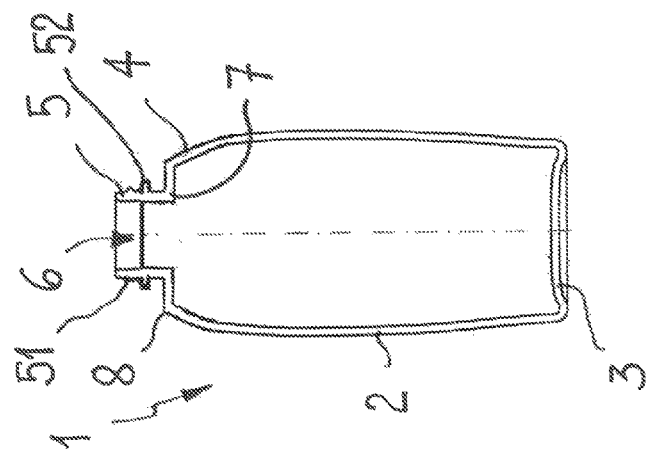
Fig. 1

ทน
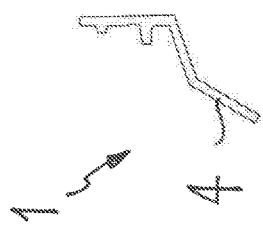
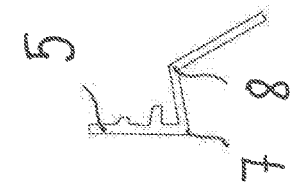
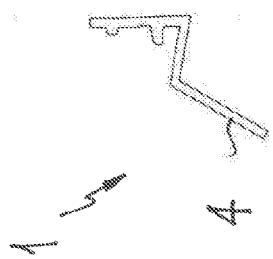
Fig. 4a
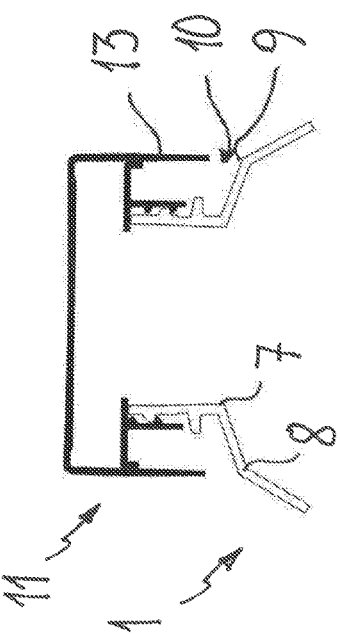
Fig. 4b  Fig. 5b

STRETCH BLOW-MOLDED PLASTIC CONTAINER, IN PARTICULAR PLASTIC BOTTLE, FOR COMPENSATING VOLUME CHANGES OF THE FILLING MATERIAL, AND PREFORM

RELATED APPLICATION

This application claims priority as a continuation application under 35 U.S.C. § 120 to PCT/EP2015/073292, which was filed as an International Application on Oct. 8, 2015 designating the U.S., and which claims priority to Swiss Application 01662/14 filed in Switzerland on Oct. 29, 2014. The entire contents of these applications are hereby incorporated by reference in their entireties.

FIELD

The present disclosure relates to plastic containers produced in a stretch blow-molding method, such as plastic bottles, which allow for a compensating of a volume change of the bottled filling material.

BACKGROUND INFORMATION

The containers made of tin or multicolored sheet metal, glass or else ceramic, common in the past, are increasingly being replaced by containers made of plastic. Primarily plastic containers are now used for the packaging of fluid substances, for example beverages, free-flowing foods such as, e.g., ketchup, sugo, pesto, sauces, mustard, mayonnaise, and the like, household products, care products, cosmetics, etc. The low weight and the lower costs certainly play a significant role in this substitution. The use of recyclable plastic materials, the use of bioplastics, and the overall more advantageous total energy balance in their production also contribute to promoting the acceptance of plastic containers, in particular plastic bottles, by consumers.

A large number of the plastic bottles and similar plastic containers now used are produced in a stretch blow-molding method. With this method, first a so-called preform with a usually elongated, tube-like shape is produced, which preform is closed with a bottom on one of its longitudinal ends and has a neck section with means for positive clamping of a closure part equipped with corresponding engagement means on the other longitudinal end. The means for positive clamping of a closure part can be, for example, threaded sections made on the outside wall of the neck part or bayonet-like projections or corresponding recesses.

The production of the preform can be carried out in an injection-molding method. However, alternative production methods for preforms are also known, for example impact extrusion or extrusion blow molding. The production of the preforms can be done separated in time and/or space from the subsequent stretch blow-molding method. In an alternative method, the preform that is produced is further processed immediately after its production without interim cooling. For stretch blow-molding, the preform is inserted into a mold cavity of a blow mold and can be inflated by a fluid, usually air, which is introduced with overpressure, expanded in the radial and axial directions. In this case, the preform is stretched in the axial direction in addition with an elongated mandrel that is run-in through the neck opening of the preform. After the elongation/blow-molding process, the finished plastic container is demolded from the blow mold.

In various applications, the plastic containers, for example for reasons of sterility or to improve the flow properties of the filling material, are bottled hot or at least warm. In this case, a hot bottling can be defined as a bottling of the filling material at a temperature of for example, 60° C. to 100° C. After the bottling, the containers are tightly closed, for example with a sealing membrane, and tilted in order to moisten the membrane. Upon cooling the filling material and the headspace, in the case of a reaction of the filling material with gases in the head space, a vacuum can be formed inside the container by a phase shift of gases (vapor to water) or else in the case of more intensive dissolving of gases with the filling material, which can have the result that the container becomes deformed. The deformation is a result of the pressure difference between the atmospheric pressure that acts on the container walls from the outside and the underpressure that develops in the interior because of cooling or the above-named effects.

In contrast, shortly after the bottling, an overpressure can also develop, for example, by the evaporation of the liquid, by degassing of the product, or by an elevated temperature of the filling material in the container neck or in the headspace of the container. After the container is cooled, however, an underpressure can result, since the gases in the headspace and the filling material itself greatly change their volumes, in particular decrease, because of the temperature difference. Underpressure can also develop in that a portion of the gas contained in the headspace is dissolved in the filling material or reacts chemically with the latter. For example, vitamin-C-containing products or products containing unsaturated fatty acid can react with the oxygen in the headspace and thus can result in underpressure.

Also, it may happen that certain contents leave the plastic container by migration processes through the container wall and leave behind an underpressure. Thus, for example, the water loss in the case of PET containers can be one-half to one percent after only one year. In the case of especially thin-walled PET bottles or in the case of PET bottles that are stored at a high temperature, this loss can be even still higher. In the case of other materials, such as, e.g., in the case of PLA, polystyrene, a water loss in the indicated order of magnitude can also occur even after a much shorter time. To some extent, a volume contraction can even occur because of a cooler environment (refrigerator), a cooler time of year (winter), or specific geographic latitudes (cold regions).

Also, the bottling and marketing of plastic bottles at different elevations above sea level can lead to deformations. Thus, in the case of plastic bottles that are bottled, for example, at the elevation of Mexico City and then are transported to the coast and distributed there, the risk of a deformation because of the greater air pressure prevailing on the coast exists. Specifically, this deformation of the plastic container in general has no effect on the quality of the filling material. For the consumer, however, often the outer manifestation of an article for sale is decisive for its selection. A plastic container that has deformations can therefore often result in the erroneous assumption of the customer that the product contained in the container no longer has the desired quality properties.

This tendency of warm or hot bottled filling material to deform during cooling can be counteracted specifically by making the wall thickness of the plastic container greater. Because of the increased need for material, however, the production of this plastic container becomes more expensive and its weight increases. Solutions are also known in which along the axial extension of the plastic container, fins and grooves are provided as stiffeners. In most cases, the mechanical stiffeners involve specially formed extrusion nozzles or injection nozzles for the production of the preforms and a special process control. Plastic bottles that have deformable areas distributed over their periphery, which areas are to compensate the pressure differences, are also known. In turn, however, these deformable areas are an obstacle to applying labels to the bottle surfaces. Also, plastic containers with flexible bottoms, which are to compensate the pressure differences, are already known. Apart from the fact that the production of such flexible bottoms is very labor-intensive and costly and thus only relatively small pressure differences can be compensated, a more flexible bottom can lead to problems with the stability of the container.

In contrast, however, it can also result in an increase in volume of the filling material, for example in the case of pasteurization, in which the filled and closed plastic container undergoes, for example, a hot shower. This increase in volume can result in a bulge in the container body or even in a turning-outward of the container bottom, which can impair the stability of the container. Both effects, which are highly undesirable, can be counteracted by a correspondingly increased wall thickness in the container body and/or the container bottom. Because of the increased need for material, however, the production of this plastic container becomes more expensive and its weight increases.

SUMMARY

A stretch blow-molded plastic container is disclosed, comprising: a container body, one longitudinal end of which is closed by a container bottom and to whose other longitudinal end is connected a shoulder section; and a container neck, which connects to the shoulder section, the shoulder section having at least two hinge-like areas that run in a circumferential direction, and which areas are arranged at a distance (a) from one another and in each case have a wall thickness (v, w) that is reduced compared to the adjoining areas, the stretch blow-molded plastic container having a total stretching ratio of greater than 11 for a longitudinal stretching ratio of 2.5 to 3.5.

BRIEF DESCRIPTION OF THE DRAWINGS

Further advantages and features follow from the subsequent description of embodiments with reference to the diagrammatic drawings. In depictions that are not true to scale:

FIG. 1 shows an axial section of an exemplary plastic container according to the present disclosure;

FIG. 2 shows a cross-section of the exemplary plastic container according to FIG. 1;

FIG. 3a shows an enlarged depiction of an exemplary container neck and an exemplary shoulder section of the plastic container according to FIG. 1;

FIG. 3b shows a depiction of the exemplary plastic container according to FIG. 3a with a mounted closure part;

FIG. 4a shows a depiction of the exemplary plastic container according to FIG. 3a with an exemplary axially descended container neck;

FIG. 4b shows a depiction of the exemplary plastic container according to FIG. 4a with a mounted closure part;

FIG. 5a shows a depiction of the exemplary plastic container according to FIG. 3a with an axially extended container neck;

FIG. 5b shows a depiction of the exemplary plastic container according to FIG. 5a with a mounted closure part.

DETAILED DESCRIPTION

Figure 6:
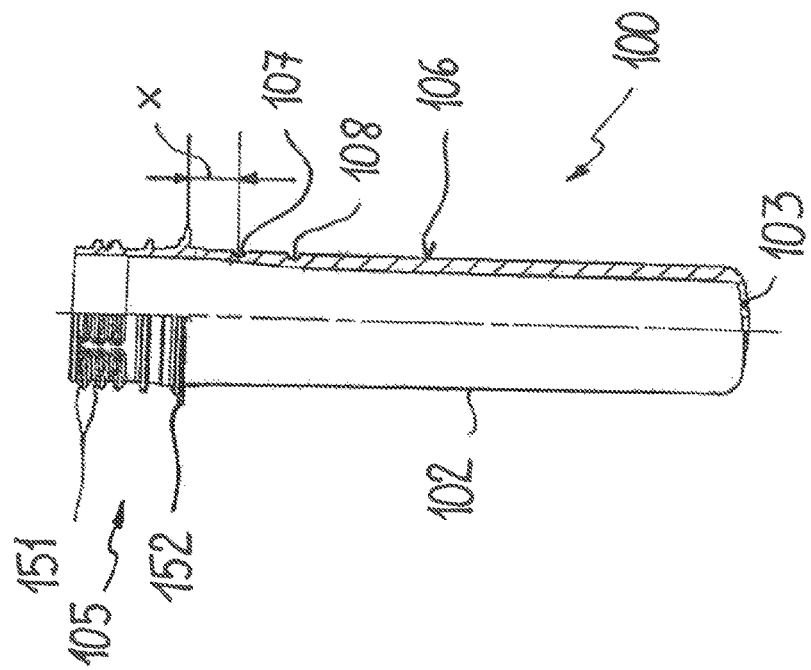
FIGS. 6 and 7 show exemplary preforms for the production of a plastic container according to the present disclosure in a stretch blow-molding method.

A plastic container, such as a plastic bottle, is disclosed which can be produced in a stretch blow-molding method, which bottle allows for a compensating of a change in volume of the bottled filling material. The plastic container can be simply and economically producible. In a further development, the plastic container can be suitable for use in connection with a closure part, which allows for an upside down storage of the container on a cover plate of the closure part.

An exemplary plastic container according to the present disclosure includes a container body, one longitudinal end of which is closed by a container bottom and to whose other longitudinal end a shoulder section connects, as well as a container neck, which connects to the shoulder section. The shoulder section has at least two hinge-like areas that run in the circumferential direction and that are arranged at a distance from one another and have a reduced wall thickness compared to the adjoining areas. The stretch blow-molded plastic container has a total stretching ratio of greater than 11 in the case of a longitudinal stretching ratio of, for example, 2.5 to 3.5.

Unlike known plastic containers, which containers have a large wall thickness in the transition from the container neck to the shoulder section and are provided with a radius to prevent an axial descent of the container neck, a plastic container as disclosed can be equipped in the shoulder section with at least two hinge-like areas that specifically make possible an axial movability of the container neck. The transition from the container neck to the shoulder section is designed, moreover, as "sharp-edged" as possible in the hinge-like area in order to support the axial movability of the container neck in addition. Because of this axial movability of the container neck, the plastic container has the possibility of compensating a change in volume of the filling material bottled therein. In this way, for example, allowance can be made for a vacuum formation in the interior of the container. By the container neck being able to move axially in the direction of the interior of the container, the vacuum is compensated. As a result, it can be avoided that the container body becomes deformed.

The axial descent of the container neck that is made possible by the at least two hinge-like areas can be concealed by a suitable selection of a closure part. Such closure parts have, for example, considerably larger dimensions than the opening diameter on the container neck would require. The cover plate of such a closure part that has a comparatively large diameter makes it possible to keep the plastic container stable, even upside down. Moreover, they have an outer jacket that extends to the shoulder section of the plastic container and can even be supported on the latter. The axial length of the outer jacket can be proportioned in such a way that the latter is supported specifically on the shoulder section in the case of a maximum axial descent of the container neck. The compensating of a vacuum formation inside the plastic container is hardly noticeable from outside in the case of a superposed closure part. Either the jacket of the closure part rests on the shoulder section, or a ring gap remains between the free end of the jacket of the shoulder part and the shoulder section, whose width is only slightly different from container to container. The hinge-like areas in the shoulder section also allow, however, a limited axial movement of the container neck in the opposite direction, out from the interior of the container. As a result, an increase in the volume of the filling material can be compensated, for example by a hot showering for pasteurization.

The high total stretching ratio of the stretch-blow-molded plastic container of, for example, greater than 11 in the case of an exemplary longitudinal stretching ratio of 2.5 to 3.5, desired for the production of the hinge-like areas, results, for example in the case of PET as a starting material, in a significantly better stretching right where the container neck transitions into the shoulder section. Because of the extensive stretching, the plastic material obtains a greater stiffness in the areas outside of the hinge-like areas. Moreover, highly stretched PET also has significantly better barrier properties relative to oxygen. Because of the extensive stretching, the plastic container has a relatively small wall thickness right where the container neck transitions into the shoulder section and also in the shoulder section itself. The thin-wall nature of the plastic container in this area can in turn be picked up by the selection of a suitable closure part with an outer jacket, which can rest on the shoulder section.

The two hinge-like areas include (e.g., consist of) an inner hinge-like area that lies closer to the container neck and an outer hinge area that is at some distance therefrom. The inner hinge-like area can have an exemplary first wall thickness that is smaller than 0.7 mm, while the outer hinge-like area has an exemplary second wall thickness, which is 0.05 mm to 0.4 mm, preferably, for example, 0.1 mm to 0.3 mm. In the case of these wall thicknesses, the hinge-like areas have a sufficient axial movability because of the forces that occur in the case of a change in volume, in particular vacuum formation or expansion, of the filling material, in order to be able to reliably compensate the latter.

In an exemplary variant embodiment, the hinge-like areas can be designed for a reversible negative deflection (buckling) and/or reversible positive deflection (stretching) of the container neck in the axial direction. The reversibility of the axial deflection of the container neck can be used as an indicator of the intactness of the filling material that is placed in the container. If the closure part is in particular manipulated or removed, such as unscrewed, the container neck returns again to its initial position. Therefore, if, when the plastic container is first opened by removing the closure part, no movement of the container neck takes place, the consumer can view this as an indication that the closure part had already been opened once before and the filling material placed in the container was possibly manipulated.

To compensate common changes in volume of the filling material that is placed in the plastic container because of vacuum formation or expansion, e.g., in the case of pasteurization, a reversible deflectability of the container neck from, for example, about ±2 mm to about ±5 mm can be viewed as sufficient.

So that the axial movability of the container neck is ensured to the desired extent, a distance of the hinge-like areas from one another measured along the container shoulder, which is, for example, 5 mm to 25 mm, may prove to be suitable.

So that the hinge-like areas in the shoulder section do not impair the outer appearance of the plastic container, they can be arranged radially inside a support area for an outer jacket of a closure part that can be applied to the container neck.

The configuration as disclosed can be applied in the most varied types of plastic containers, such as plastic bottles. The plastic container can be designed in one or more layers. The only condition is that it be manufactured from plastics that are suitable for the stretch blow-molding method. Examples of such plastics are PET, PET-G, HDPE, PP, PS, PVC, PEN, copolymers of the cited plastics, bioplastics, such as, for example, PLA or PEF, filled plastics, and mixtures of the above-mentioned plastics. The plastics or parts thereof can be dyed and/or coated.

The design and configuration of the plastic container as disclosed herein is not specifically bound to a specific cross-section of the container body and the shoulder section. In an exemplary variant, the container body and the adjoining shoulder section, however, have a cross-section that deviates from the circular shape. For example, the container body and the adjoining shoulder section have an oval cross-section, since such plastic containers are used in many cases in connection with closure parts that have a considerably larger cross-section than the cross-section of the pour opening of the container would require, and an outer jacket that projects from a cover plate, which jacket can be supported in the superposed state of the closure part in the shoulder section of the container. Equipped with such a closure part, the plastic container can also be stored upside down in a stable manner. This facilitates as complete as possible an emptying of the plastic container of its usual pasty filling material, such as, e.g., ketchup, mustard, pesto, etc.

A preform for the production of a plastic container of the type described previously in a stretch-blow-molding method has an elongated, tube-like preform body, which is closed with a bottom on one of its longitudinal ends and has a neck section on the other longitudinal end. On the neck section, means can be configured for positive locking of a closure part equipped with corresponding engagement means. The means for positive locking of a closure part can be, for example, threaded sections designed on the outside wall of the neck part or bayonet-like projections or corresponding recesses.

In exemplary cases, the production of the preform is carried out in an injection-molding method. However, alternative production methods for preforms are also known, for example impact extruding or else extrusion blow molding. The production of the preforms can be carried out separated in time and/or space from the subsequent stretch blow-molding method. In an alternative method, the preform that is produced can be further processed immediately after its production without interim cooling. For stretch blow-molding, the preform is inserted into a mold cavity of a blow mold and is expanded in the radial and axial directions, for example, inflated, by a medium, usually air, injected with overpressure. In this case, the preform is stretched in the axial direction in addition with an elongated mandrel that is run-in through the neck opening of the preform. After the elongation/blow-molding process, the finished plastic container is demolded from the blow mold. The disclosed preform can be distinguished in that the preform body in an area below the neck section has at least two axial annular circumferential areas that are some distance apart and whose wall thickness is less than a wall thickness in the adjoining areas of the preform body.

The annular circumferential areas with smaller wall thicknesses are designed in an area of the preform body that forms the shoulder section in the case of the stretch-blow-molded plastic container. In order to achieve the high total stretching ratio of, for example, greater than 11 that is necessary for the forming of the hinge-like areas in the case of an exemplary longitudinal stretching ratio of 2.5 to 3.5, usually compared to approximately 2, the preform can be designed somewhat shorter than is otherwise common. The total stretching ratio usually does not, for example, exceed the value of 20.

In a variant exemplary embodiment, the circumferential areas can be designed with smaller wall thicknesses than grooves that run radially in an inside wall of the preform body. Because of the high total stretching ratio, the grooves in the inside wall of the preform body have only a comparatively shallow depth. As a result, in the production of the preform in the injection-molding method or in the impact-extruding method, the core always remains still easily demoldable despite a slight undercut in the inside wall of the preform.

The preform can be designed in an otherwise known manner and can have a support ring that projects radially from an outside wall of the preform and separates the preform neck and the preform body from one another. The support ring is used for, for example, axial support of the preform in the blow mold. The support ring can also remain unchanged on the finished stretch-blow-molded plastic container and can be used for easier transport of the plastic container. The annular circumferential areas, for example the radial grooves in the inside wall and/or outside wall of the preform body, are arranged at an axial distance from the support ring in the preform body. As a result, in the case of the finished stretch blow-molded plastic container, the support ring does not prevent the axial movability, such as the axial descent, of the container neck. In an exemplary variant embodiment of the preform, to this end, an annular circumferential area that lies closer to the support ring can be separated from the support ring by an axial distance of, for example, 4 mm to 45 mm. In this case, this distance relates to the middle of the annular circumferential area in the middle of the support ring. The free axial distance between the support ring and the container shoulder that is necessary for the unimpeded axial descent of the container neck to the desired extent is then created by the stretching process in the case of the stretch-blow-molding method.

Referring now to the drawings, FIG. 1 shows diagrammatically a plastic container that is designed according to an exemplary embodiment, such as a plastic bottle, which carries the reference number 1 overall. The plastic container 1 is produced from a pre-fabricated preform by a stretch blow-molding method. The preform has an elongated, tube-like preform body, which is closed with a bottom on one of its longitudinal ends and has a neck section on the other longitudinal end. On the neck section of the preform, means can be configured for positive clamping of a closure part equipped with corresponding engagement means. The means for positive locking of a closure part can be, for example, threaded sections configured on the outside wall of the neck part or bayonet-like projections or corresponding recesses.

In exemplary cases, the production of the preform is carried out in an injection-molding method. However, alternative production methods for preforms are also known, for example impact extruding or else extrusion blow molding. The production of the preforms can be carried out separated in time and/or space from the subsequent stretch-blow-molding method. In an alternative method, the preform that is produced can be further processed immediately after its production without interim cooling. In the case of the stretch-blow-molding method, the preform is inserted into a mold cavity of a blow mold and is expanded in the radial and axial directions, in particular inflated, by a medium, usually air, injected with overpressure. In this case, the preform is stretched in the axial direction in addition with an elongated mandrel that is run-in through the neck opening of the preform. After the elongation/blow-molding process, the finished plastic container is demolded from the blow mold.

The stretch-blow-molded plastic container 1 has a container body 2, one axial end of which is closed with a container bottom 3. A shoulder section 4 connects to the end of the container body 2 that is opposite to the container bottom 3. Finally, a container neck 5 connects with a pour opening 6 to the shoulder section 4. The contour of the container neck 5 can correspond to the neck of the preform, from which the plastic container is produced in the stretch-blow-molding method, since the latter in this case, for example, is no longer changed. Accordingly, the container neck can have means for positive locking of a closure part that is equipped with corresponding engagement means. The means for positive locking of a closure part can, as indicated in FIG. 1, for example, be threaded sections 51 that are designed on the outside wall of the neck part. Finally, the container neck 5 can also still have an essentially radially projecting transfer ring 52 that runs in the circumferential direction, which in the case of the preform separates the preform body from the preform neck, and is used to facilitate the transport of the preform and the plastic container 1 produced therefrom.

The shoulder section 4 has at least two hinge-like areas that run in the circumferential direction, namely an inner hinge-like area 7 and an outer hinge-like area 8. The hinge-like areas 7, 8 are arranged at a distance a from one another and in each case have a decreased wall thickness compared to the adjoining areas. The stretch-blow-molded plastic container produced from a preform has an exemplary total stretching ratio of greater than 11 in the case of an exemplary longitudinal stretching ratio of 2.5 to 3.5.

FIG. 2 shows a top view of the exemplary plastic container 1 of FIG. 1. According to the depicted embodiment, the plastic container 1 has a container body 2 and a shoulder section 5 with an oval cross-section. Such plastic containers are used in many cases for storing pasty filling material, such as, for example, ketchup, sugo, pesto, sauces, mustard, mayonnaise, and the like. They are often closed with a closure part, which has a larger cross-section than the diameter of the pour opening 6 on the container neck 5 would require. Because of their larger diameter, the closure part has a cover plate, which can be used as a platform for a reliable upside-down storage of the plastic container 1. This type of storage can facilitate a largely complete emptying of the plastic container 1.

FIG. 3a diagrammatically shows the container neck 5 and the shoulder section 4 of the plastic container 1 that connects axially thereto. In the hinge-like areas, namely in the inner hinge-like area 7 and the outer hinge-like area 8, the plastic container 1 in each case has wall thicknesses that are smaller than in the adjoining areas. An exemplary first wall thickness v in the inner hinge-like area 7 is in this case smaller than 0.7 mm. There is an exemplary second wall thickness w of 0.05 mm to 0.4 mm, preferably, for example, 0.1 mm to 0.3 mm, in the outer hinge-like area 8 that is separated therefrom. A transition from the container neck 5 to the inner hinge-like area 7 is designed in as angular a manner as possible. The same holds true for the transition from the outer hinge-like area 8 to the adjoining areas of the shoulder section 4. The inner hinge-like area 7 and the outer hinge-like area 8 can be a distance a from one another, which is, for example, 5 mm to 25 mm, measured along the shoulder section 4.

FIG. 3b shows the container neck 5 with a mounted closure part 11. The closure part 11 has a cover plate 12, from which an outer jacket 13 projects. The outer jacket surrounds a closure support 14, on which are designed the actual engagement means, for example an inside threading 15. The inside threading 15 engages in the threaded sections 51 on the outside wall of the container neck 5. The outer jacket 13 of the closure part 11 has an axial length, which is sized in such a way that it projects over the closure supports and ends before a support area 9 on the shoulder section 4 in the case of a closure part 11 that is superposed on an empty plastic container 1. As a result, an annular gap 10 remains free between the edge of the outer jacket 12 and the support area 9. The annular gap 10 can have a width s, which is, for example, 2.5 mm to 5.5 mm.

FIGS. 4a and 4b show the container neck 5 and the container shoulder 4 in a sectional view analogous to FIG. 3a and FIG. 3b. FIG. 4a shows the container neck 5 without a closure part 11, and FIG. 4b shows the container neck 5 with a mounted closure part 11. Because of an underpressure prevailing within the plastic container 1, the container neck 5 is drawn into the interior of the container in the axial direction. In this case, the shoulder section 4 bends in the hinge-like areas 7, 8. The axial deflection is, for example, reversible and amounts to, for example, 2 mm to 5 mm. The closure part 11 that is mounted on the container neck 5, for example screwed on, takes part in the axial descent movement. In this case, the outer jacket 13 of the closure part 11 is dropped, and the width of the annular gap 10 is reduced between the edge of the outer jacket 13 of the closure part 11 and the support area 9 on the container shoulder 4. In the case of maximum axial descent of the container neck 5, the edge of the outer jacket 13 lies on the support area 9 of the shoulder section 4. A further descent of the container neck 5 is thus prevented.

FIG. 5a and FIG. 5b show the container neck 5 and the shoulder section 4 in sectional views that are analogous to FIGS. 4a and 4b. Because of an overpressure that prevails inside the plastic container 1, as it can occur, for example, in the case of a hot showering of the filled plastic container for pasteurization, the container neck 5 has been raised axially in a direction away from the interior of the container. The axial lift is, for example, 2 mm to 5 mm. The hinge-like areas 7, 8 allow this movability of the container neck 5 and the shoulder section 4. The movability of the hinges, for example, the axial lift of the container neck 5, can be reversible. The annular gap 10 between the edge of the outer jacket 13 of the closure part 11 and the support area 9 on the container shoulder 4 is somewhat wider compared to the initial position (FIG. 3b). This is virtually invisible to the consumer from the outside, however.

Figure 7:
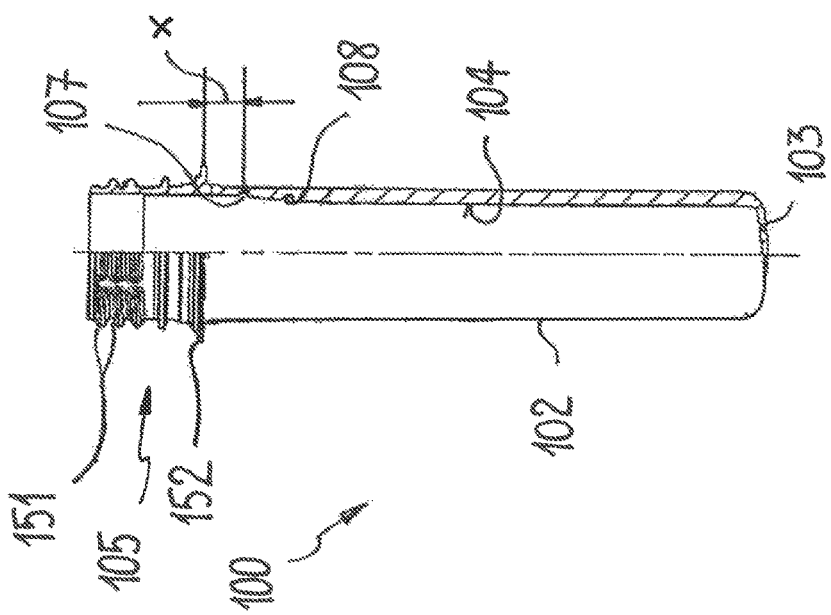

FIG. 6 and FIG. 7 in each case show an exemplary preform 100 for the production of a plastic container, as disclosed herein, in a stretch blow-molding method. The preform 100 has an elongated, tube-like preform body 102, which is closed with a bottom 103 on one of its longitudinal ends and has a preform neck 105 on the other longitudinal end. On the preform neck 105, means can be configured for positive locking of a closure part equipped with corresponding engagement means. The means for positive locking of a closure part can be, for example, threaded sections 151 designed on the outside wall of the neck part 105 or bayonet-like projections or corresponding recesses.

In exemplary cases, the production of the preform 100 is carried out in an injection-molding method. However, alternative production methods for preforms, for example, impact extruding or else extrusion blow molding, are also known. The production of the preforms 100 can be carried out separated in time and/or space from the subsequent stretch-blow-molding method. In an alternative method, the preform 100 that is produced can be further processed immediately after its production without interim cooling. For stretch blow molding, the preform 100 is inserted into a mold cavity of a blow mold and is expanded in the radial and axial directions, in particular inflated, by a medium, usually air, injected with overpressure. In this case, the preform 100 is stretched in the axial direction in addition with an elongated mandrel that is run-in through the neck opening of the preform. After the elongation/blow-molding process, the finished plastic container is demolded from the blow mold. The preform 100 as disclosed can be distinguished in that the preform body 102 in an area below the neck section 105 has at least two axial annular circumferential areas 107, 108 that are some distance apart and whose wall thickness is in each case less than a wall thickness in the adjoining areas of the preform body 102.

The annular circumferential areas 107, 108 with smaller wall thicknesses are configured in an area of the preform body 102 that forms the shoulder section in the case of the stretch-blow-molded plastic container. In order to achieve the exemplary high total stretching ratio of greater than 11 that is necessary for the forming of the hinge-like areas in the case of an exemplary longitudinal stretching ratio of 2.5 to 3.5 usually compared to approximately 2, the preform 100 can be configured somewhat shorter than is otherwise common. The total stretching ratio of an exemplary finished stretch-blow-molded plastic container from the preform 100 usually does not exceed the value of 20.

The circumferential areas 107, 108 with smaller wall thicknesses can be configured as grooves that run radially, for example, in an inside wall of the preform body 102. Because of the high total stretching ratio, the groove-shaped circumferential areas 107, 108 in the inside wall 104 of the preform body 102 have only a comparatively shallow depth. As a result, in the production of the preform in the injection-molding method or in the impact-extruding method, the core still always remains easily demoldable despite a slight undercut in the inside wall of the preform 104. For example, in the case of injection molding, an expanding core can also be used in order to facilitate the demolding of the preform.

In an alternative exemplary variant embodiment of the preform 100 that is depicted in, for example, FIG. 7, the groove-shaped circumferential areas 107, 108 can also be arranged in the outside wall 106 of the preform 100. Another exemplary variant embodiment of the preform, not depicted in more detail, can have a combination of groove-shaped circumferential areas on the inside wall and on the outside wall. Finally, the radial circumferential areas in each case can also be formed by grooves on the inside and outside walls of the preform, arranged on the same axial elevation.

The preform 100 can otherwise be designed in known fashion and can have, for example, a support ring 152, which projects radially from an outside wall of the perform and separates the preform neck and the preform body from one another. The support ring 152 is used, for example, for axial support of the preform 100 in the blow mold. The support ring 152 can also remain unchanged on the finished stretch-blow-molded plastic container and can be used for easier transport of the plastic container. The annular circumferential areas 107, 108, for example the radial grooves in the inside wall 104 of the preform body 102, are arranged at an axial distance from the support ring 152 in the preform body 102. As a result, in the case of the finished stretch-blow-molded plastic container, the support ring 152 does not impede the axial movability, for example, the insertion, of the container neck. For example, to this end, the annular circumferential area 107 that lies closer to the support ring 152 can be separated from the support ring 152 by an exemplary axial distance x of 5 mm to 25 mm. The free axial distance between the support ring and the container shoulder that is necessary for the unimpeded insertion of the container neck to the desired extent is then created by the stretching process in the case of the stretch blow-molding method.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A stretch blow-molded plastic container, comprising:
    a container body, one longitudinal end of which is closed by a container bottom, and to another longitudinal end of which is connected a shoulder section; and
    a container neck, which connects to the shoulder section, the shoulder section having at least two hinge like areas that run in a circumferential direction, and which hinge areas are arranged at a distance (a) between each other, and each area having a wall thickness (v, w) that is reduced compared to adjoining areas, the stretch blow-molded plastic container having a total stretching ratio of greater than 11 for a longitudinal stretching ratio of 2.5 to 3.5.

2. The plastic container according to claim 1, wherein an inner hinge area that lies closer to the container neck than an outer hinge area, has a first wall thickness (v) that is less than 0.7 mm and the outer hinge area has a second wall thickness (w) that is 0.05 mm to 0.4 mm.

3. The plastic container according to claim 2, wherein the second wall thickness (w) of the outer hinge area has a wall thickness (w) that is 0.1 mm to 0.3 mm.

4. The plastic container according to claim 3, wherein the hinge areas are configured for a reversible negative deflection and/or a reversible positive deflection of the container neck in an axial direction.

5. The plastic container according to claim 4, wherein a capability of the container neck for reversible deflection is ±2 mm to ±5 mm.

6. The plastic container according to claim 5, wherein the hinge areas have a distance (a) of 5 mm to 25 mm between each other measured along a container shoulder.

7. The plastic container according to claim 6, wherein the hinge areas are arranged radially inside a support area for an outer jacket of a closure part that is configured to be mounted on the container neck.

8. The plastic container according to claim 7, being configured in one or more layers from plastics that are suitable for stretch blow-molding.

9. The plastic container according to claim 8, comprising:
    material selected from a group consisting of PET, PET-G, HDPE, PP, PS, PVC, PEN, copolymers of the cited plastics, bioplastics, PLA or PEF, filled plastics, and mixtures of the above-mentioned plastics.

10. The plastic container according to claim 9, wherein the container body and the shoulder section have a non-circular cross-section.

11. The plastic container according to claim 10, wherein the container body and the shoulder section have an oval cross-section.

12. A preform for production of a plastic container according to claim 1, the preform comprising:
    an elongated, tube-like preform body, which is closed with a bottom on one of its longitudinal ends and has a preform neck on the other longitudinal end, wherein the preform body in an area below the preform neck has at least two axial annular circumferential areas that are separated from one another and whose wall thickness is less than a wall thickness in the adjoining areas of the preform body.

13. The preform according to claim 12, wherein the annular circumferential areas with wall thicknesses less than grooves that run radially are configured in an inside wall and/or outside wall of the preform body.

14. The preform according to claim 13, wherein the preform neck and the preform body are separated from one another by a support ring that projects radially from an outside wall, and the annular circumferential areas are arranged in the preform body at an axial distance from the support ring.

15. The preform according to claim 14, wherein an annular circumferential area that lies closer to the support ring is spaced from the support ring by an axial distance (x) of 5 mm to 25 mm.

16. The plastic container according to claim 1, wherein the hinge areas are configured for a reversible negative deflection and/or a reversible positive deflection of the container neck in an axial direction.

17. The plastic container according to claim 1, wherein the hinge areas have a distance (a) from one another that is measured along the container shoulder and that is 5 mm to 25 mm.

18. The plastic container according to claim 1, wherein the hinge areas are arranged radially inside a support area for an outer jacket of a closure part that is configured to be mounted on the container neck.

19. The plastic container according to claim 1, being configured in one or more layers from plastics that are suitable for stretch blow-molding.

20. The plastic container according to claim 1, wherein the container body and the shoulder section have a non-circular cross-section.

* * * * *